W. E. PORTER.
MAXIMUM DEMAND ELECTRIC METER.
APPLICATION FILED FEB. 19, 1910.
1,077,749.
Patented Nov. 4, 1913.
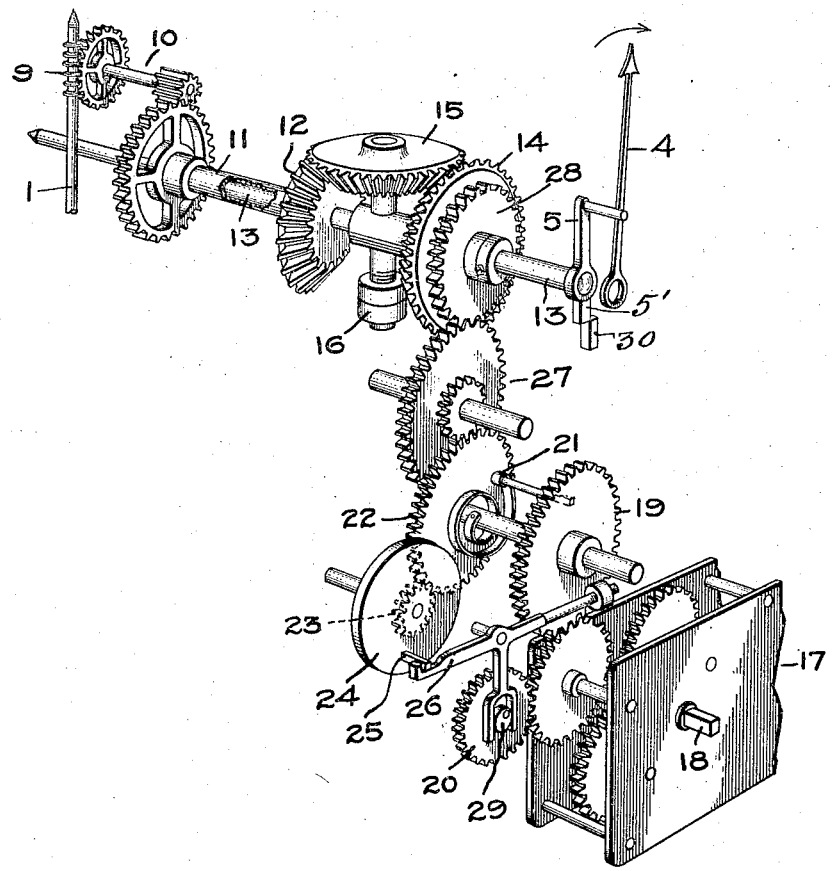
Witnesses:
George W. Tilden
J. Ellis Glen
Inventor:
Willard E. Porter,
by Albert G. Davis
His Attorney.

UNITED STATES PATENT OFFICE.

WILLARD E. PORTER, OF LYNN, MASSACHUSETTS, ASSIGNOR TO GENERAL ELECTRIC COMPANY, A CORPORATION OF NEW YORK.

MAXIMUM-DEMAND ELECTRIC METER.

1,077,749.

Specification of Letters Patent.

Patented Nov. 4, 1913.

Application filed February 18, 1910. Serial No. 544,758.

*To all whom it may concern:*

Be it known that I, WILLARD E. PORTER, a citizen of the United States, residing at Lynn, county of Essex, State of Massachusetts, have invented certain new and useful Improvements in Maximum-Demand Electric Meters, of which the following is a specification.

My invention relates to maximum demand electric meters and has for its object an improvement in such apparatus.

My invention may be applied to any of the well known forms of electric meter which have a continuously revolving armature.

Broadly speaking, my invention consists of the meter, a differential gear, a clock work mechanism and a dial pointer arranged so that it will remain fixed in any position to which it is moved and adapted so as to only receive forward impulses from an actuating shaft. These various elements of my invention are so correlated that the clock work mechanism will cause the meter element to move the dial pointer in a forward direction during frequently recurring intervals, each of a definite and exact time length. At the end of these intervals the shaft which actuates the pointer is returned to a zero position by means of a spring which is wound up by the clock mechanism. The intermittent motion is obtained through the action of the differential gear.

The principle upon which this meter acts is that a certain speed of the moving meter element will produce a forward rotation of the shaft of a certain amount for a given time, and the pointer will be moved a distance to correspond. The shaft is moved by the meter mechanism at recurring intervals of an equal time length. Between these intervals it is returned to a zero position. During the subsequent movements of the shaft, if the meter is running more slowly than for the first movement, that is, measuring a lesser quantity of energy, the pointer will not be moved. If the meter is measuring a greater quantity of energy, the pointer will be moved a farther distance so as to register an amount corresponding to the quantity of energy being measured by the meter during the time interval in which the shaft moves.

The novel features of my invention are pointed out in the claims attached to and made a part of this specification.

For a further understanding of my invention reference may be had to the accompanying drawing where the figure shows in perspective the essential features of my invention, the meter mechanism being omitted.

Referring to the figure, the rotatable meter shaft 1 drives the usual gearing for the registering mechanism which I have not shown, and also by means of worm 9 drives a shaft and gearing 10. Since the meter itself forms no part of my invention I have not illustrated the same, and it is to be understood that my invention is adapted to be carried out with any type of motor meter. The gearing 10 drives a hollow shaft 11 to one end of which is attached the gear member 12 of a differential gearing. Through shaft 11 runs shaft 13 to one end of which is fastened the dog 5. This dog moves pointer 4 in the well known manner. The pointer is arranged to remain in the position to which it is moved. Loosely mounted on shaft 13 is the second member 14 of the differential gear, and in operative relation with these two members is the planetary gear member 15 operatively fastened to shaft 13 and counterweighted by a weight 16.

A clock work mechanism 17 is partly shown, which mechanism may be wound up in the usual manner by a key placed over shaft 18. This clock work mechanism has one of its wheels meshing with the gear 20 and with the gear 19 which is loosely mounted on a shaft. It will be obvious that gears 19 and 20 may be driven in any desired manner from the clockwork mechanism. Gear 19 winds up spring connection 21, one end of the spring being firmly attached to the shaft upon which gear 19 rotates and to this shaft is also attached gear wheel 22. In operative relation with gear wheel 22 is a pinion 23 mounted on a shaft to which is also firmly attached a disk 24 having a pin 25, which pin is held against movement by lever 26. A gear train 27 connects gear 22 with a gear 28 fastened to gear member 14 and also rotating loosely on shaft 13. Attached to gear member 20 is a cam 29 so arranged as to move lever 26 and lock gear wheel 22 and also release the same.

The operation of my device is as follows: The meter mechanism moves shaft 11 and gear 12 continuously when energy is being consumed. The clock work mechanism performs two functions. It causes the actuating shaft to rotate at recurring intervals of a definite and equal time length, and after such rotation it causes the actuating shaft to be returned to an initial or zero position. The forward rotation of the shaft is accomplished through the action of pin 25 and lever 26 which lock wheel 22, gear train 27 and thus gear member 14. When gear member 14 is locked or kept from movement, planetary gear 15 is carried forward by the action of gear member 12, and, as the planetary gear is fastened to the shaft 13, this shaft is rotated in the direction shown by the arrow, thus moving pointer 4. While this action is going on, the clock work mechanism by means of wheel 19 winds up spring connection 21. When the lever 26 is moved out of engagement with pin 25, that is, when the differential gear member is unlocked, spring 21 will cause gear train 27 and gear member 14 to move in such a direction that planetary gear 15 will reverse its direction of rotation and will return dog 5 to its zero position.

As the energy stored up in the spring 21 is the same for each time interval, it is evident that the gear 28 will rotate through equal angles each time the pin 25 is released. This angle must obviously be large enough to return the dog 5 to its initial or zero position, which latter may be determined in any well known manner, as for example, by an extension 5' on the dog coöperating with a fixed stop 30. As the gear 28 rotates at the end of each period through equal angles it is evident that the dog 5 must be arranged to slip relatively to the gear 28, in order that the latter may complete its rotation when the former has reached its zero or initial position. The slip may occur at any convenient point in the gearing, operatively connecting these members, for example, between the shaft 13 and the sleeve on which the planetary gear 15 is mounted, the operative connection between these points being such that it will transmit the torque necessary to drive the dog forward, but will slip when on the return movement the dog 5 reaches its zero position.

It will be obvious that as shaft 13 is rotated for equal time lengths the amount of its forward rotation, and hence the position to which it moves the pointer, will depend on the speed at which the shaft is rotated. This speed is proportional to the energy measured by the meter. It will also be obvious that for a correct reading of the pointer, the shaft should be returned after each movement to an initial or zero position which should be a fixed position. If this be the case, during the recurrent time intervals of movement of the shaft, the pointer will be moved forward an amount representing the greatest movement of the shaft or the maximum energy in the circuit to which the meter is connected. As the pointer is so arranged that it will remain in the position to which it is moved, it will thus register the maximum demand or the maximum quantity of energy consumed by the circuit.

While I have illustrated my invention as applied to a particular form and arrangement of parts, I do not limit myself to this especial form and arrangement but seek in the attached claims to cover all forms and arrangements which will be within the scope of my invention and will be obvious to those skilled in the art.

What I claim as new and desire to secure by Letters Patent of the United States, is,—

1. The combination with a rotatable shaft of a second shaft, a differential gearing comprising two gear members loosely mounted on the second shaft and a planetary member adapted to rotate said second shaft, and means for causing said gearing to rotate the second shaft and for reversing the direction of rotation of said second shaft.

2. The combination with a rotatable shaft of a second shaft, a differential gearing comprising two gear members loosely mounted on the second shaft and a planetary member adapted to rotate said second shaft, and means for causing said gearing to rotate the second shaft at recurring intervals of a definite time length and for returning said second shaft to its initial position at the end of each interval.

3. In a motor meter, a differential gearing comprising two gear members and a planetary member, means for driving one of the gear members from the meter, a shaft adapted to be rotated by the planetary member in one direction, and means for driving the other of said gear members for reversing the direction of rotation of the shaft.

4. In a motor meter, a differential gearing comprising two gear members and a planetary member, means for driving one of the gear members from the meter, a shaft adapted to be rotated in one direction by the planetary member, and means for periodically rotating the shaft in a reverse direction.

5. In a motor meter, a differential gearing comprising two gear members and a planetary member, means for driving one of the gear members from the meter, means for periodically locking the second gear member for equal intervals of time, a shaft adapted to be rotated by the planetary member in one direction, and means for rotating the shaft in the other direction when the second gear member is unlocked.

6. In a motor meter, a differential gearing comprising two gear members and a planetary member, means for driving one of the gear members from the meter, means for locking the second gear member during equal intervals of time, a shaft adapted to be rotated by said planetary member, a spring adapted to reverse the direction of rotation of said shaft at the end of each equal interval of time, and a motor for energizing said spring during each of the intervals of time.

7. In a meter, in combination a differential gear comprising two gear members and a planetary member in operative relation therewith, a shaft adapted to be rotated by the planetary member, means for causing the meter mechanism to drive one of the gear members, means for intermittently locking the other gear member and means for rotating said shaft when the locking means is not in operation.

8. In a meter, in combination a differential gear comprising two gear members and a planetary member in operative relation therewith, a shaft having a zero position and adapted to be rotated by the planetary member, means for causing the meter mechanism to drive one of the gear members, a clock work mechanism intermittently locking the other gear member causing the shaft to rotate and means for returning the shaft to its zero position when the locking means is inoperative.

9. In a meter, in combination a differential gear comprising two gear members and a planetary member in operative relation therewith, a shaft having a zero position and adapted to be rotated by the planetary member, means for causing the meter mechanism to drive one of the gear members, a clock work mechanism intermittently locking the other gear member at recurring intervals of a definite and equal time length, causing a forward rotation of the shaft during said intervals, and means for reversing the direction of rotation of the shaft and returning the shaft to its zero position, and a pointer adapted to be moved in one direction by the forward rotation of the shaft.

10. In a meter, in combination a differential gear comprising two gear members and a planetary member in operative relation therewith, a shaft having a zero position and adapted to be rotated by the planetary member, means for causing the meter mechanism to drive one of the gear members, a clock work mechanism intermittently locking the other gear member at recurring intervals of a definite and equal time length causing a forward rotation of the shaft during said intervals, a spring adapted to reverse the direction of rotation of the shaft and return it to its zero position, means for causing the clock work mechanism to wind said spring, and a pointer adapted to be moved in one direction by the forward rotation of the shaft and to remain in the position to which it is moved.

11. In a meter, in combination a shaft having a dog, a differential gear comprising two gear members loosely mounted on said shaft and a planetary member in operative relation with the gear members and the shaft, means for causing the meter mechanism to drive one of the gear members, a clock work mechanism, a gear train in operative relation with the second gear member of the differential gear, means operated by said mechanism for intermittently locking the gear train at recurring intervals of a definite and equal time length causing a forward rotation of the shaft, a spring adapted to reverse the direction of rotation of the shaft and return it to its zero position, means for causing the mechanism to wind the spring, and a pointer adapted to be moved in one direction by the rotation of the shaft, and to remain in the position to which it is moved.

In witness whereof, I have hereunto set my hand this sixteenth day of February, 1910.

WILLARD E. PORTER.

Witnesses:
JOHN A. MCMANUS, Jr.,
CHARLES A. BARNARD.

Copies of this patent may be obtained for five cents each, by addressing the "Commissioner of Patents, Washington, D. C."